US012378807B2

(12) United States Patent
Baldreich et al.

(10) Patent No.: US 12,378,807 B2

(45) Date of Patent: Aug. 5, 2025

(54) FURNITURE FITTINGS FOR THE MOVABLE MOUNTING OF A FURNITURE PART

(71) Applicant: Julius Blum GmbH, Hoechst (AT)

(72) Inventors: Armin Baldreich, Lauterach (AT); Alexander Simon Flogaus, Eriskirch (DE); Andreas Holzapfel, Bregenz (AT); Dominik Hagspiel, Hoechst (AT); Peter Gabel, Meiningen (DE)

(73) Assignee: JULIUS BLUM GMBH, Hoechst (AT)

( * ) Notice: Subject to any disclaimer, the term of this patent is extended or adjusted under 35 U.S.C. 154(b) by 149 days.

(21) Appl. No.: 18/141,575

(22) Filed: May 1, 2023

(65) Prior Publication Data

US 2023/0265699 A1 Aug. 24, 2023

Related U.S. Application Data

(63) Continuation of application No. PCT/AT2021/060408, filed on Nov. 5, 2021.

(30) Foreign Application Priority Data

Nov. 12, 2020 (AT) .............................. A 50981/2020

(51) Int. Cl.

*E05F 1/10* (2006.01)
*E05D 15/40* (2006.01)
*E05F 1/12* (2006.01)

(52) U.S. Cl.

CPC ............ *E05F 1/1058* (2013.01); *E05D 15/40* (2013.01); *E05F 1/1261* (2013.01); (Continued)

(58) Field of Classification Search

CPC ...... E05F 1/1058; E05F 1/1261; E05D 15/40; E05Y 2800/21; E05Y 2800/242; (Continued)

(56) References Cited

U.S. PATENT DOCUMENTS 3,531,823 A * 10/1970 Cornelius ............... E05D 11/06 16/361
3,737,180 A * 6/1973 Hayes, Jr. ............... F16L 41/06 285/373

(Continued)

FOREIGN PATENT DOCUMENTS

CA 3 058 692 10/2018
DE 26 13 661 10/1977

(Continued)

OTHER PUBLICATIONS

International Search Report issued Feb. 23, 2022 in International (PCT) Application No. PCT/AT2021/060408.

*Primary Examiner* — Jason W San
*Assistant Examiner* — Matthew J Sullivan
(74) *Attorney, Agent, or Firm* — Wenderoth, Lind & Ponack, L.L.P.

(57) ABSTRACT

A furniture fitting includes a lever mechanism for moving a furniture part, the lever mechanism including a lever pivotally supported about a hinge axis, and the lever has a cylindrical opening in which the hinge axis is arranged with a clearance. A force storage member is configured to apply a force to the lever mechanism. The hinge axis, upon a pivoting movement of the lever, is movable from a first bearing location within the opening to a second bearing location within the opening under the influence of the force storage member. A spring element pressurizes the hinge axis with a force in a direction extending transversely to a virtual line connecting the two bearing locations of the hinge axis within the opening of the lever.

20 Claims, 6 Drawing Sheets

(52) U.S. Cl.
CPC ..... *E05Y 2201/626* (2013.01); *E05Y 2800/21* (2013.01); *E05Y 2800/242* (2013.01); *E05Y 2800/266* (2013.01); *E05Y 2800/344* (2013.01); *E05Y 2900/20* (2013.01)

(58) Field of Classification Search
CPC ......... E05Y 2800/266; E05Y 2800/344; E05Y 2900/20; E05Y 2201/626
See application file for complete search history.

(56) References Cited

U.S. PATENT DOCUMENTS

| | | | | | |
|---|---|---|---|---|---|
| 4,985,939 | A * | 1/1991 | Otte | E05F 1/1261 | 49/386 |
| 5,479,678 | A * | 1/1996 | Reed | E05F 1/1223 | 16/361 |
| 5,632,067 | A * | 5/1997 | Lautenschlager | E05D 5/08 | 16/382 |
| 5,761,769 | A * | 6/1998 | Bruckner | E05D 11/084 | 16/386 |
| 10,221,603 | B2 * | 3/2019 | Graham | E05D 11/0054 | |
| 10,494,846 | B2 * | 12/2019 | Schmid | E05D 3/16 | |
| 10,662,690 | B2 | 5/2020 | Schluge | | |
| 10,900,269 | B2 | 1/2021 | Holzapfel et al. | | |
| 11,507,145 | B2 * | 11/2022 | Nakamura | E05F 1/1207 | |
| 11,525,295 | B2 | 12/2022 | Nordieker et al. | | |
| 11,697,957 | B2 * | 7/2023 | Holzapfel | A47B 96/20 | 16/286 |
| 12,000,188 | B2 * | 6/2024 | Schmid | E05D 15/40 | |
| 12,044,052 | B2 * | 7/2024 | Hirtsiefer | E05D 11/0009 | |
| 12,116,819 | B2 * | 10/2024 | Baldreich | E05D 3/14 | |
| 2018/0363346 | A1 | 12/2018 | Holzapfel et al. | | |
| 2021/0010311 | A1 | 1/2021 | Nordieker et al. | | |
| 2023/0018847 | A1 * | 1/2023 | Keck | E05D 3/06 | |
| 2023/0265699 | A1 * | 8/2023 | Baldreich | E05F 1/1058 | 49/381 |
| 2023/0272648 | A1 * | 8/2023 | Baldreich | E05F 1/10 | 312/325 |
| 2023/0272649 | A1 * | 8/2023 | Baldreich | E05D 5/0276 | 312/325 |
| 2023/0272655 | A1 * | 8/2023 | Baldreich | E05D 15/40 | 49/381 |

FOREIGN PATENT DOCUMENTS

| | | |
|---|---|---|
| JP | 2019-511651 | 4/2019 |
| WO | 2017/143379 | 8/2017 |

* cited by examiner

FURNITURE FITTINGS FOR THE MOVABLE MOUNTING OF A FURNITURE PART

BACKGROUND OF THE INVENTION

The present invention relates to a furniture fitting for movably supporting at least one furniture part on a furniture carcass. The furniture fitting comprises:

- a lever mechanism for moving the at least one furniture part, the lever mechanism including at least one lever pivotally supported about a hinge axis, and the at least one lever has at least one, in particular cylindrical, opening in which the hinge axis is arranged with a clearance, and
- at least one force storage member, preferably including a spring device, for applying a force to the lever mechanism, wherein the at least one hinge axis, upon a pivoting movement of the at least one lever, is movable from a first bearing location within the at least one opening to a second bearing location within the at least one opening under the influence of the at least one force storage member.

Moreover, the invention relates to an item of furniture comprising a furniture carcass, a furniture part movably-supported relative to the furniture carcass, the furniture part preferably being a furniture flap configured to be elevated relative to the furniture carcass, and a furniture fitting of the type to be described for moving the movably-supported furniture part.

Such furniture fittings are used, for example, for moving furniture flaps, and the force storage member of the furniture fitting is provided for compensating for a weight force of the furniture flap. In this case, an opening force is applied to the lever mechanism by the force storage member so as to assist the opening movement of the furniture flap by the force storage member. Therefore, the operator needs to exert less force, in particular when moving heavy furniture flaps. On the other hand, the force storage member is also used to apply a closing force to the lever mechanism upon a closing movement of the furniture flap, after a dead-center position has been exceeded. As a result, the furniture flap connected to the lever mechanism can be retracted into the closed position and can be pressed onto the furniture carcass with a retaining force.

In the region of the dead-center position, there is thus a change of direction of the force of the force storage member applied to the lever mechanism. Therefore, the hinge axis jerkily jumps within the opening from a first bearing location to a second bearing location. This also leads to an undefined, jerky movement behavior of the furniture flap in the region of the dead-center position, and to undesired noise emissions.

A first approach for resolving this problem is disclosed in WO 2017/143379 A1. Here, an actuating drive for moving a furniture flap is disclosed. The actuating drive includes at least two levers hingedly connected to each other via a hinge axis. By a resilient third lever, the hinge axis is stationarily pressed against a bearing contour of the opening with a respective large operating force, thereby preventing that the hinge axis jerkily jumps within the opening. A drawback is the fact that the friction of the hinge axis is massively increased thereby, and thus large manual forces for moving the furniture fitting are required. Moreover, a higher material usage is connected with this construction.

SUMMARY OF THE INVENTION

It is an object of the present invention to provide a furniture fitting of the type mentioned in the introductory part, thereby avoiding the above-discussed drawbacks.

According to the invention, at least one spring element is provided, the at least one spring element pressurizing the hinge axis with a force at least in a direction extending transversely to a notional (virtual) connecting line of the two bearing locations of the at least one hinge axis within the at least one opening of the at least one lever.

In other words, the hinge axis is not stationarily held within the opening of the lever by a force of the spring element on a single bearing location. Instead, according to the invention, the hinge axis is movable within the opening from a first bearing location to a second bearing location. However, the hinge axis can be guided in a gliding contact along a bearing contour connecting the first bearing location and the second bearing location to each other due to a transverse force applied by the spring element.

Due to the gliding contact of the hinge axis along the aforementioned bearing contour, it can be ensured that the hinge axis, in a region of the dead-center position, does not jerkily hit against a bearing location of the opening under the emission of undesired noises. For pressing the hinge axis against the bearing contour, a relatively weak force accumulator can be sufficient so as to significantly reduce the frictional forces compared with the prior art according to WO 2017/143379 A1.

The invention can advantageously be applied, in particular, to furniture fittings with a lever mechanism having a dead-center position, in which the lever mechanism is neither pressurized in a closing direction nor in an opening direction by the at least one force storage member, and in which the at least one hinge axis is movable from the first bearing location to the second bearing location when the dead-center position is exceeded.

BRIEF DESCRIPTION OF THE DRAWINGS

Further details and advantages of the present invention will be explained with the aid of the embodiments shown in the figures, in which.

DETAILED DESCRIPTION OF THE INVENTION

Figure 1A:
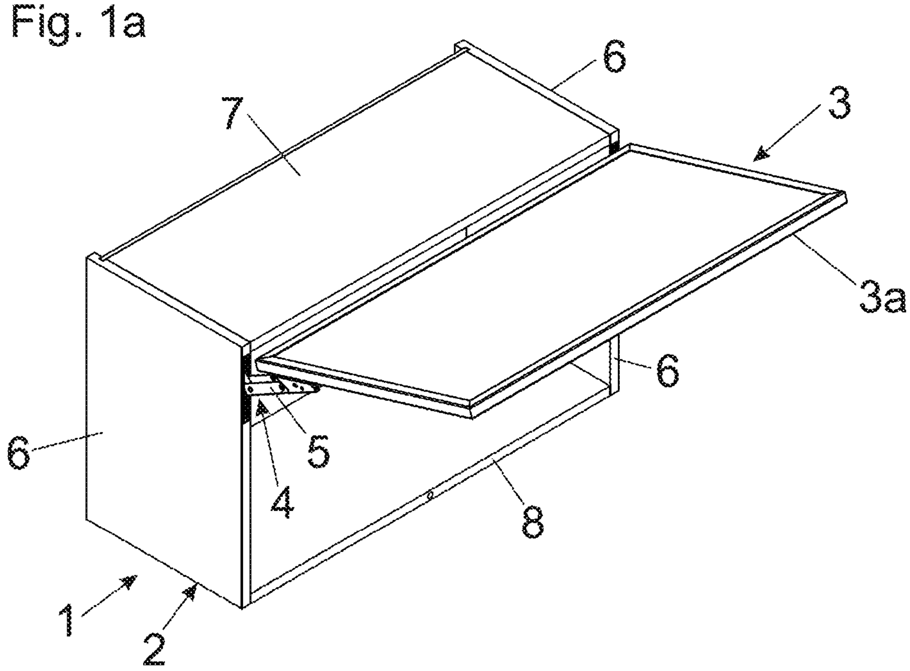
FIG. 1*a*, 1*b* show an item of furniture with a movable furniture part in a perspective view and in an exploded view.

FIG. 1*a* shows a perspective view of an item of furniture 1 comprising a furniture carcass 2, a furniture part 3 movably-supported relative to the furniture carcass 2, and at least one furniture fitting 4, for example in the form of a furniture drive 4*a*, for moving the movable furniture part 3. The item of furniture 1 includes furniture panels 6 in the form of sidewalls, a top panel 7 and a bottom panel 8. For example, the movable furniture part 3 can be in the form of furniture flap 3*a* configured to pivot relative to the furniture carcass 2 about a horizontally extending axis.

In the shown embodiment, a housing 9 (FIG. 1*b*) of the furniture fitting 4 is at least partially, preferably substantially entirely, received within the furniture panel 6 configured as a sidewall. The movable furniture part 3 is movably supported between a closed position in which the furniture carcass 2 is covered, and an open position in which the furniture part 3 is elevated relative to the furniture carcass 2.

Of course, it is also possible to integrate the furniture fitting 4 into a horizontally extending furniture panel, thus within the top panel 7, within the bottom panel 8 and/or within a shelf board arranged between the top panel 7 and the bottom panel 8 for example. In such a case, the movable furniture part 3 is pivotally supported relative to the furniture carcass 2 about a vertically extending axis in the mounted position.

In the shown embodiment, the furniture fitting 4 includes a lever mechanism 5 for moving the movable furniture part 3, and at least one force storage member 10 (FIG. 1*b*) for applying a force to the lever mechanism 5.

Figure 1B:
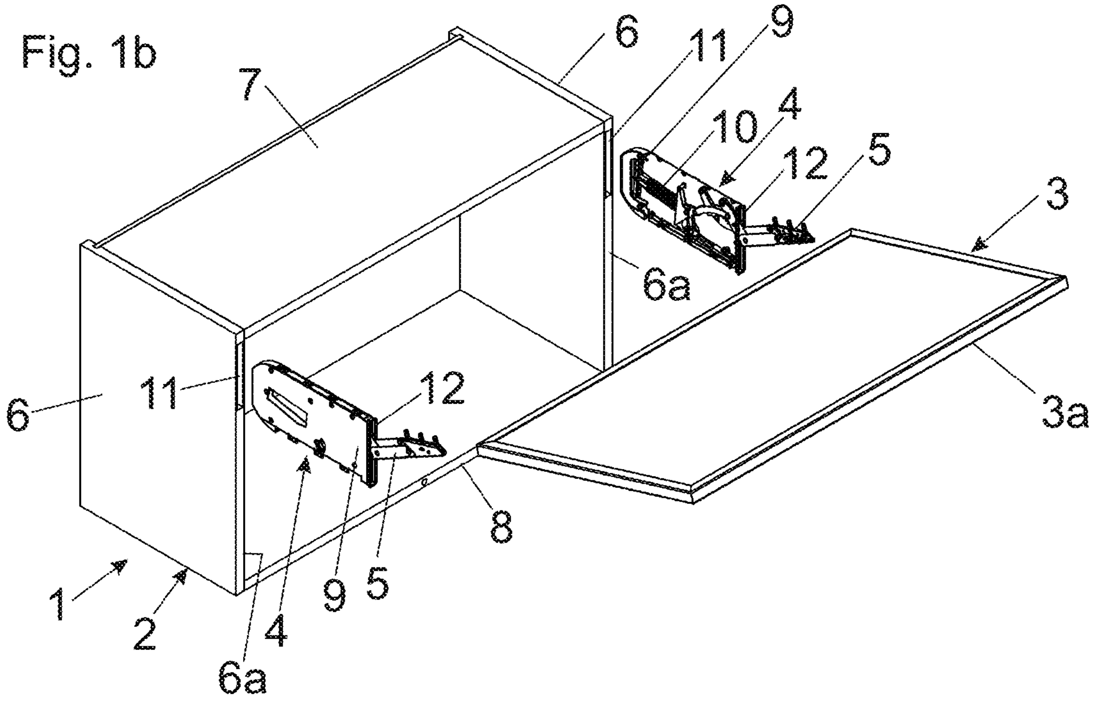

FIG. 1*b* shows the item of furniture 1 in an exploded view, in which two furniture fittings 4, preferably identical in construction, in the form of furniture drives 4*a* are provided for moving the movable furniture part 3. Each of the furniture fittings 4 includes a housing 9 configured to be fixed to the furniture carcass 2.

According to an embodiment, the housing 9 of the furniture fitting 4, in a mounted condition, is at least partially, preferably substantially entirely, received within a recess 11 of the furniture panels 6 configured as sidewalls. In a mounted condition, the housing 9 can be arranged substantially flush with a front face 6*a* of the furniture panel 6.

The recess 11 can be configured as a blind hole for example. The housing 9 of the furniture fitting 4 can be inserted from the front during the mounting procedure (that is to say from the narrow front face 6*a* of the furniture panel 6) into the, preferably pocket-shaped, recess 11 of the furniture panel 6. In a mounted condition, the housing 9 of the furniture fitting 4 is substantially entirely received within a predetermined wall thickness of the furniture panel 6.

Within or on the housing 9, at least one force storage member 10, in particular including a spring device, is arranged for applying a force to the lever mechanism 5. A cover 12 is provided on the front-end region of the housing 9, and at least one movably-supported lever 5*a*, 5*b*, 5*c* (FIG. 3*a*) of the lever mechanism 5 projects through the cover 12 in an open position of the lever mechanism 5.

Figure 2:
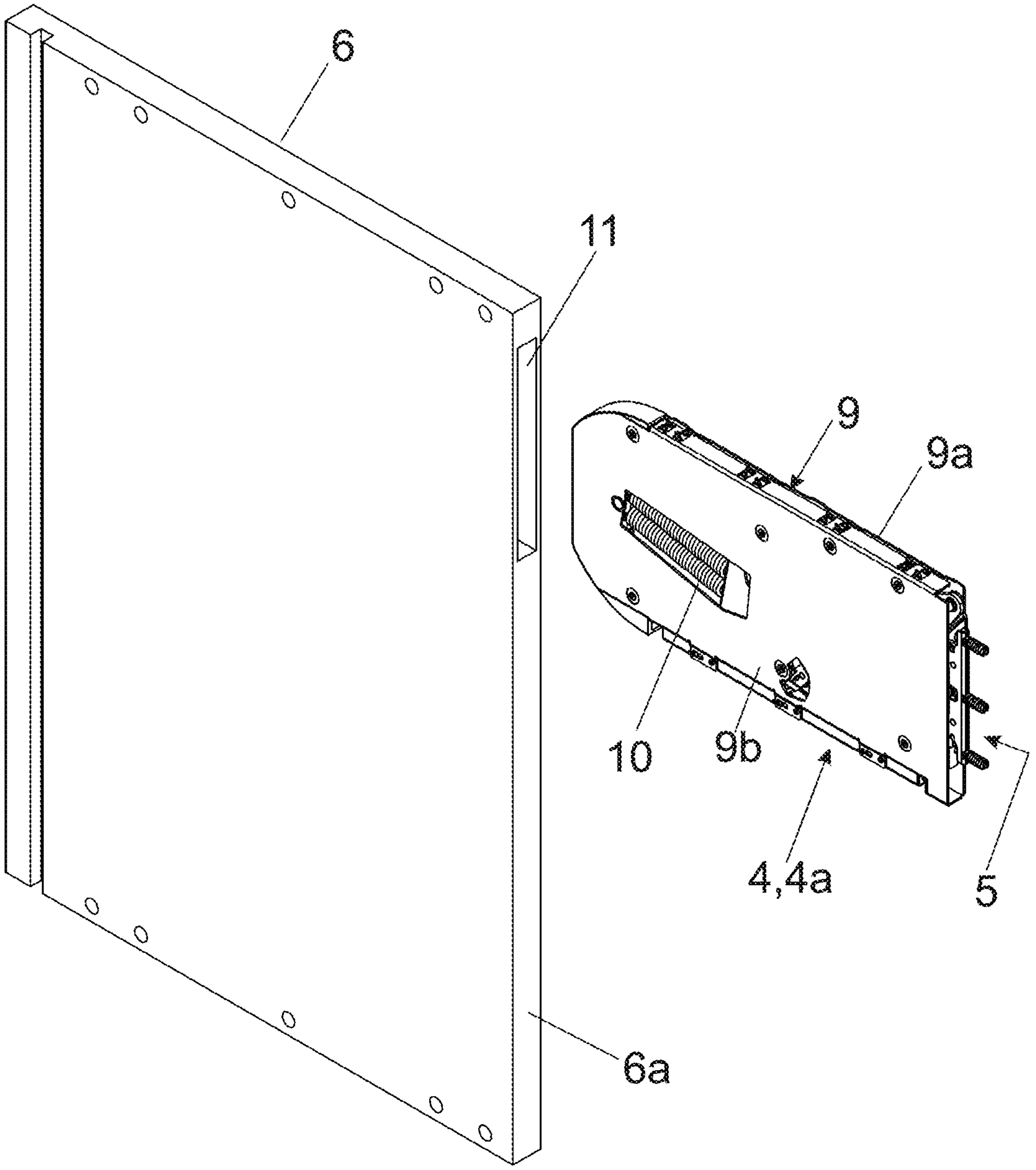
FIG. 2 is a perspective view of a furniture fitting configured to be arranged within a furniture panel.

FIG. 2 shows a perspective view of the furniture fitting 4 configured to be arranged within the furniture panel 6. In a mounted condition, the housing 9 of the furniture fitting 4 can be substantially entirely arranged within the furniture panel 6. The furniture panel 6 includes a recess 11, for example a blind hole, for receiving the furniture fitting 4. The housing 9 of the furniture fitting 4 is thus configured to be inserted or to be integrated within a furniture panel 6 of the furniture carcass 2.

The housing 9 of the furniture fitting 4 can be configured substantially cuboidal. In the shown embodiment, the housing 9 includes two flat-shaped housing walls 9*a*, 9*b* mutually spaced apart from each other in a parallel relationship, and the lever mechanism 5 for moving the movable furniture part 3 and the force storage member 10 for applying a force to the lever mechanism 5 can be received between the housing walls 9*a*, 9*b*.

Figure 3A:
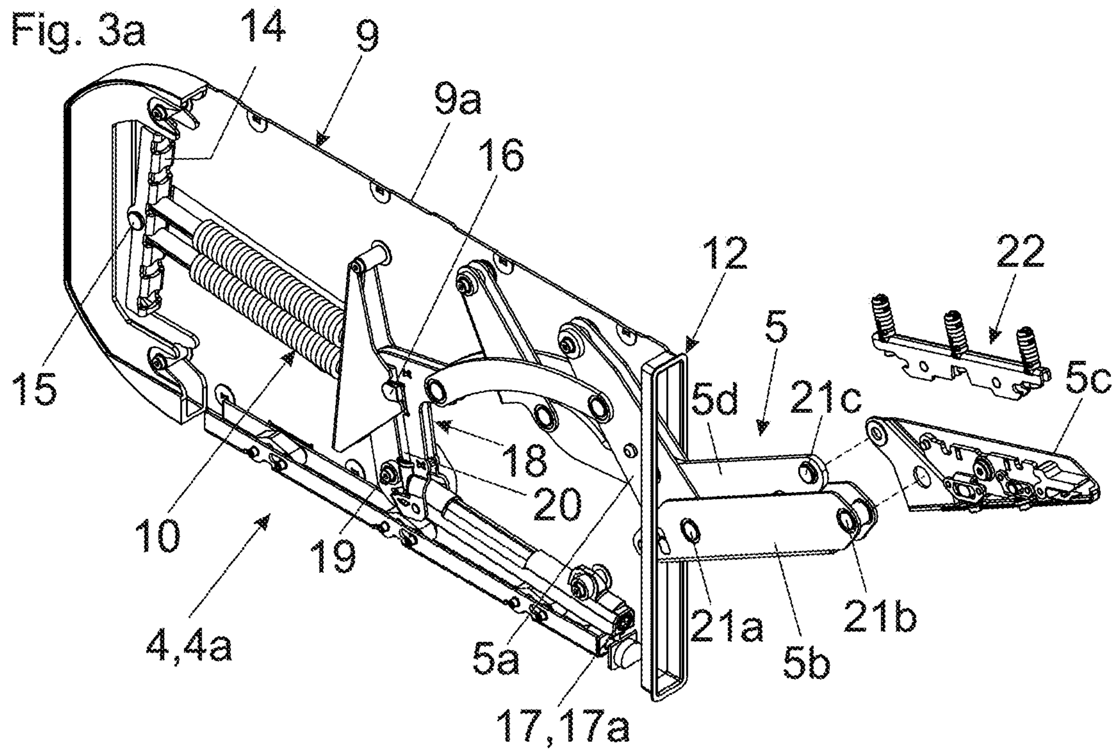
FIG. 3*a*-3*d* is a perspective view of the furniture fitting in the form of a furniture drive, and schematic views of a hinge axis arranged within an opening according to the prior art and according to the invention.

FIG. 3*a* shows a perspective view of the furniture fitting 4 in the form of the furniture drive 4*a*. The force storage member 10 for applying a force to the lever mechanism 5 can include, for example, a plurality of helical springs, in particular compression springs. The force storage member 10 is supported with a first end region on a supporting member 14 pivotable about the pivoting axis 15. A second end portion of the force storage member 10 is supported on an engagement location 16, the engagement location 16 being adjustably supported along a threaded spindle 20 by an adjustment device 17.

The threaded spindle 20, in the shown embodiment, is arranged on an intermediate lever 18 pivotable about a pivoting axis 19. By an actuation of an, preferably rotatably supported, operating element 17*a* of the adjustment device 17, the engagement location 16 can be moved along the threaded spindle 20, and the distance between the engagement location 16 and the pivoting axis 19 of the intermediate lever 18 and thus the torque of the force storage member 10 applied to the lever mechanism 5 can be adjusted.

The operating element 17*a* of the adjustment device 17, in a mounted condition of the furniture fitting 4, faces towards the movable furniture part 3 and is arranged in a front region of the housing 9 of the furniture fitting 4.

The lever mechanism 5, as is known per se, can be releasably locked to a fitting element 22 configured to be fixed to the movable furniture part 3.

The lever mechanism 5 includes at least one lever 5*a* pivotally supported about a hinge axis 21*a*. The at least one lever 5*a* includes at least one, in particular cylindrical, opening 23 (FIG. 3*a*-3*d*) in which the hinge axis 21*a* is arranged with a clearance. In the shown embodiment, the lever mechanism 5 includes a plurality of levers 5*a*, 5*b*, 5*c*, 5*d* for moving the movable furniture part 3. The levers 5*a*, 5*b*, 5*c*, 5*d* are hingedly connected to each other by hinge axes 21*a*, 21*b*, 21*c*.

Figure 3B:
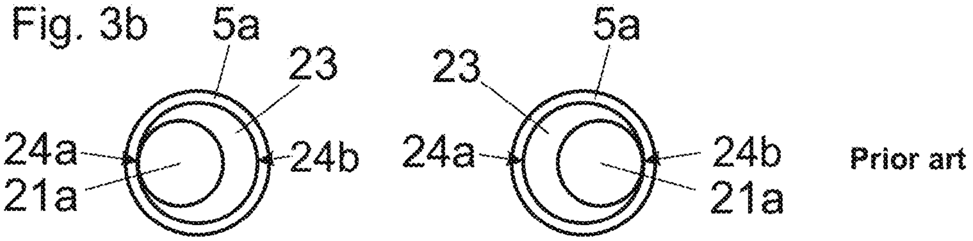

FIG. 3*b* shows the arrangement of a hinge axis 21*a* within a cylindrical opening 23 of a lever 5*a* according to the prior art. The hinge axis 21*a* bears against a first bearing location of the opening 23 under the influence of the force storage member 10.

When a dead-center position of the lever mechanism 5 is exceeded, a change of direction of the force of the force storage member 10 applied to the lever mechanism 5 occurs. That means that within a closing range between the fully closed position and the dead-center position of the lever mechanism 5, the force storage member 10 applies a closing force to the lever mechanism 5. In contrast, within an opening range between the dead-center position and the fully open position of the lever mechanism 5, the force storage member 10 applies an opening force to the lever mechanism 5.

This change of direction of the spring force leads to the fact that the hinge axis 21*a*, as shown in FIG. 3*b*, jumps jerkily from the first bearing location 24*a* within the opening 23 of the lever 5*a* to a second bearing location 24*b* (the figure on the right of FIG. 3*b*). This leads to an undefined movement behavior of the lever mechanism 5 in the region of the dead-center position. Moreover, the jump of the hinge axis 21*a* from the first bearing location 24*a* to the second bearing location 24*b* is connected with undesired noise emissions.

Figure 3C:
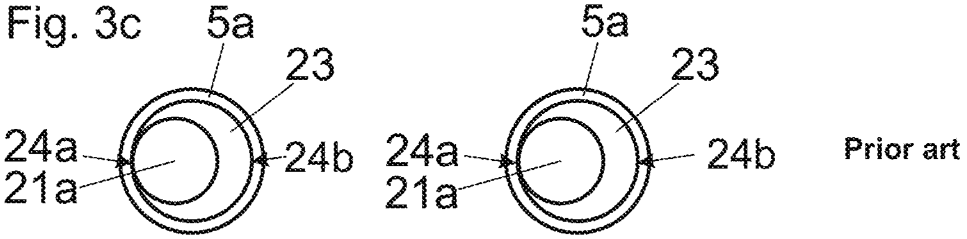

FIG. 3*c* also shows an embodiment according to the prior art, namely according to the WO 2017/143379 A1 reference already mentioned in the introductory part. With this prior art, the hinge axis 21*a* is stationarily pressed with a respective large operating force against the bearing location 24*a* of the opening 23 by a resilient lever. As a result, the jerky jumping of the hinge axis 21*a* to the second bearing location 24*b* within the opening 23 of the lever 5*a* can be prevented. However, a drawback is the fact that the friction between the hinge axis 21*a* and the bearing contour of the opening 23 is thereby also increased. Therefore, respective large manual forces for moving the furniture fitting 4 are required.

Figure 3D:
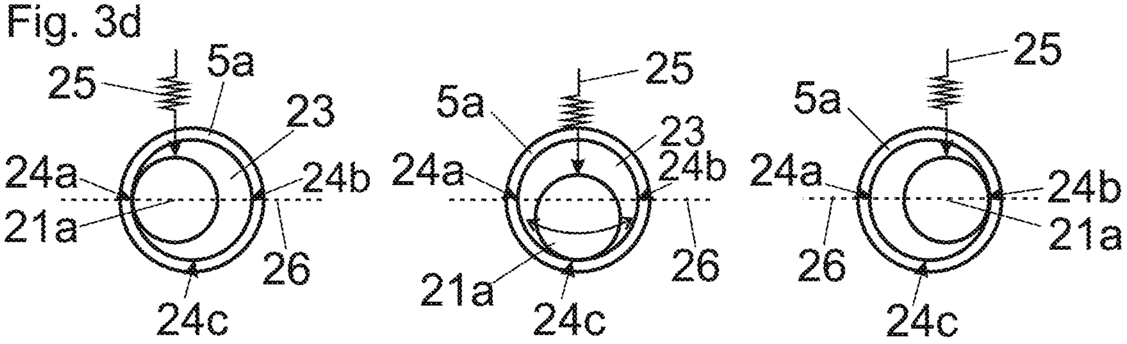

FIG. 3*d* schematically shows the basic principle of the present invention. Instead of stationarily fixing the hinge axis 21*a* to a bearing location 24*a* according to the prior art of FIG. 3*c* by a spring force, the hinge axis 21*a* (that is to say a preferably cylindrical pin of the hinge axis 21*a*) according to FIG. 3*d*, is pressurized with a force of a spring element 25 in a direction extending transversely to a notional (virtual) connecting line 26 of the two bearing locations 24*a*, 24*b* within the opening 23 of the lever 5*a*. This has the consequence that the hinge axis 21*a*, upon a change of direction of the force of the force storage member 10, can be glidingly guided, under the influence of the force storage member 10 and due to a force of the spring element 25, along the curved-shaped bearing contour 24*c* of the opening 23, the bearing contour 24*c* connecting the first bearing location 24*a* and the second bearing location 24*b* to each other.

Hence, the hinge axis 21*a* can be moved, in fact, within the opening 23 of the lever 5*a* between the two bearing locations 5*a*, 5*b*. However, this movement takes place in a gliding contact with the bearing contour 24*c*. Therefore, jerky jumps of the hinge axis 21*a* within the opening 23 and thus noise emissions associated therewith can be effectively prevented. The force of the spring element 25 can be dimensioned relatively small so as to hold the friction between the hinge axis 21*a* and the bearing contour 24*c* within a tolerable limit.

Figure 4A:
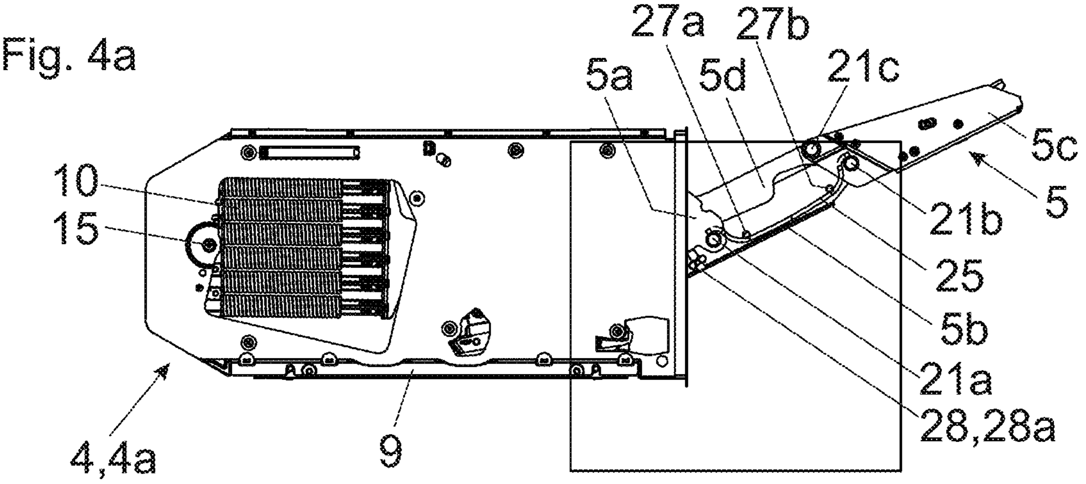
FIG. 4*a*, 4*b* show the furniture fitting in a side view and an enlarged detail view thereof.

FIG. 4*a* shows the furniture fitting 4 in the form of the furniture drive 4*a* in a side view, in which the lever mechanism 5 is located in a maximum open position relative to the housing 9 of the furniture fitting 4.

By a limiting device 28 comprising a rotatably-supported adjustment wheel 28*a*, the maximum open position of the lever mechanism 5 can be limited. In this way, collisions between the movable furniture part 3 and a room ceiling can be prevented.

The lever mechanism 5 includes at least one lever 5*a* pivotally supported about a hinge axis 21*a*. In the shown embodiment, a plurality of levers 5*a*, 5*b*, 5*c*, 5*d* is provided, the levers 5*a*, 5*b*, 5*c*, 5*d* being hingedly connected to each other via hinge axes 21*a*, 21*b*, 21*c*. By a spring element 25, for example by a form spring made of steel, the hinge axis 21*a* can be pressurized with a transverse force. The spring element 25 can be supported on at least one abutment 27*a*, 27*b* so as to apply a sufficiently large force to the hinge axis 21*a*.

The lever mechanism 5 can include at least five, preferably at least seven, hinge axes 21*a*, 21*b*, 21*c*.

The at least one lever 5*a* is connected to a second lever 5*b* of the lever mechanism 5 via the hinge axis 21*a*, and a relative position of the two levers 5*a*, 5*b* can be varied upon a pivoting movement.

In the shown figure, the at least one second lever 5*b* is pivotally connected to at least one third lever 5*c* of the lever mechanism 5 via a further hinge axis 21*b*. Preferably, the at least one spring element 25 applies a force to the hinge axis 21*a* connecting the at least one lever 5*a* with the at least one second lever 5*b*, and also applies a force to the further hinge axis 21*b*.

The lever mechanism 5 can have a lever configuration arranged in a parallelogram shape, and the at least one lever 5*a* forms part of the lever configuration. The spring element 25 can be operative between two hinge axes 21*a*, 21*b* of the lever configuration. This has the advantage that at least two hinge axes 21*a*, 21*b* can be pressurized with a transverse force by a single spring element 25.

The at least one second lever 5*b* is pivotally connected to at least one third lever 5*c* of the lever mechanism 5 via a further hinge axis 21*b*.

Preferably, the spring element 25 applies a force to the hinge axis 21*a* connecting the at least one lever 5*a* with at least one second lever 5*b*, and also applies a force to the further hinge axis 21*b*.

Figure 4B:
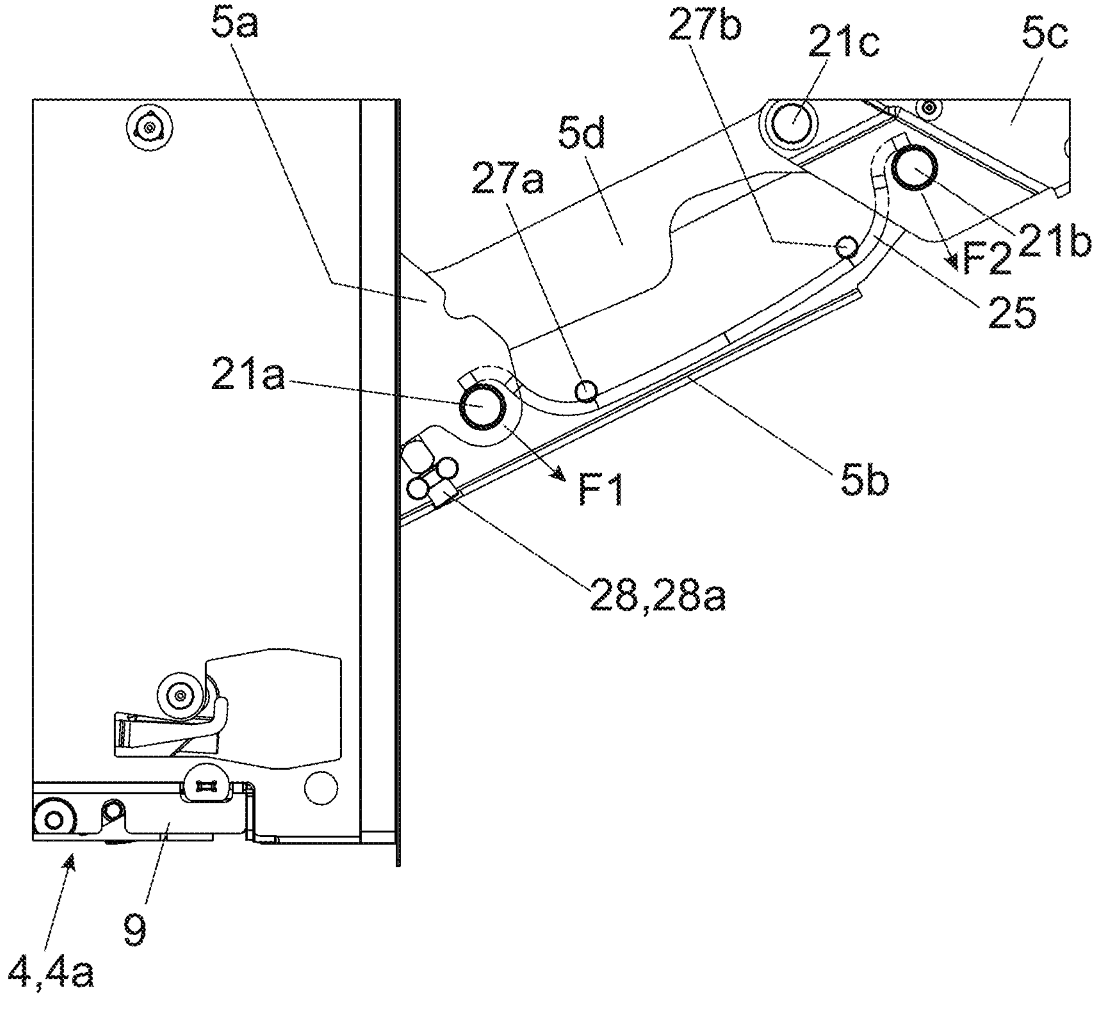

FIG. 4*b* shows the framed region of FIG. 4*a* in an enlarged view. It can be seen that the spring element 25 supported on the abutments 27*a*, 27*b* applies a first force F1 to the first hinge axis 21*a*, and also applies a second force F2 to the second hinge axis 21*b*.

According to a preferred embodiment, the at least one spring element 25 partially embraces at least one hinge axis 21*a*, 21*b* and/or presses against a peripheral rim of the hinge axis 21*a*, 21*b*.

The spring element 25 can be supported on at least one abutment 27*a*, 27*b*. The abutment 27*a*, 27*b* can be pin-shaped, or can be configured as a limb of a lever 5*a*, 5*b*, 5*c*, 5*d* of the lever mechanism 5.

According to an embodiment of the invention, the at least one spring element 25:

is configured to be curved-shaped at least over a region, and/or is configured to be elastically deformable at least over a region, and/or is configured as a form spring, and/or consists of metal, and/or is operative between at least two hinge axes 21*a*, 21*b*, 21*c* of the lever mechanism 5.

Figure 5:
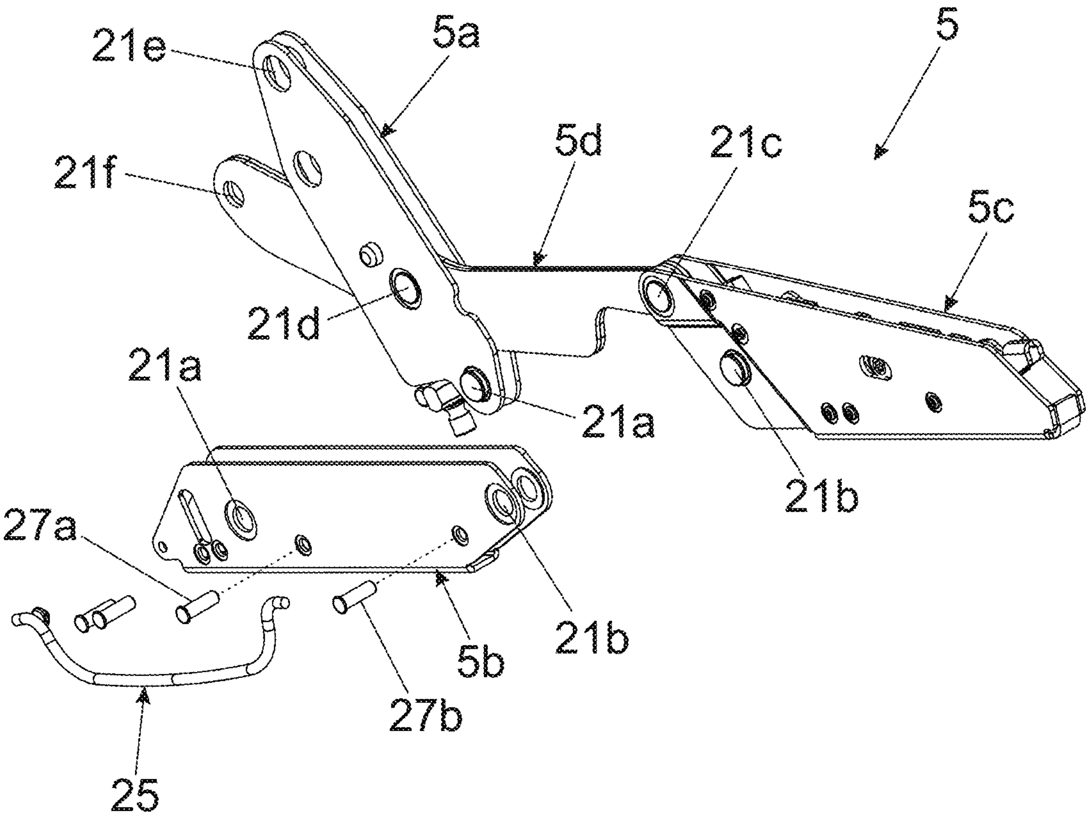
FIG. 5 is an exploded view of a lever mechanism with a spring element.

FIG. 5 shows an exploded view of the lever mechanism 5 with a spring element 25 for applying a force to at least one hinge axis 21*a*, 21*b*, 21*c*, 21*d*, 21*e*, 21*f*. The lever mechanism 5 can include a plurality of levers 5*a*, 5*b*, 5*c*, 5*d* hingedly connected to each other, the levers 5*a*, 5*b*, 5*c*, 5*d* being pivotally supported about the hinge axes 21*a*, 21*b*, 21*c*, 21*d*, 21*e*, 21*f*. Due to the spring element 25 and the abutments 27*a*, 27*b*, both the hinge axis 21*a* and also the hinge axis 21*b* can be pressurized with a force F1, F2.

However, it is also possible to pressurize two or more hinge axes 21*a*, 21*b*, 21*c*, 21*d*, 21*e*, 21*f* with a force by one single spring element 25. This can be provided, for example, by a spring element 25 in the form of a spring clip pressing simultaneously against a plurality of hinge axes 21*a*, 21*b*, 21*c*, 21*d*, 21*e*, 21*f*.

Figure 6A:
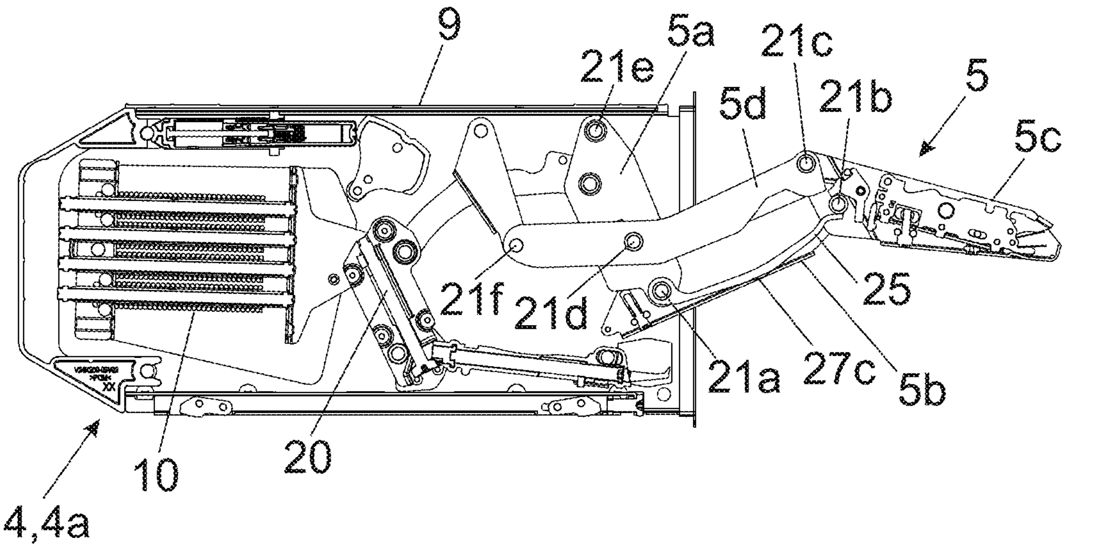
FIG. 6*a*, 6*b* show the furniture fitting with a slightly modified spring element in a side view and the lever mechanism associated therewith in an exploded view.

FIG. 6*a* shows a side view of the furniture fitting 4 configured as a furniture drive 4*a* with a slightly modified spring element 25. In contrast to the previously described embodiment, the spring element 25 is pivotally supported about a hinge axis 21*a*, 21*b*, 21*c*, 21*d*, 21*e*, 21*f*, and the spring element 25 entirely embraces the hinge axis 21*a*, 21*b*, 21*c*, 21*d*, 21*e*, 21*f*.

In the shown embodiment, the spring element 25 is pivotally supported about a first hinge axis 21*a*, is supported with a central portion on an abutment 27*c* formed as a limb of the lever 5*b*, and presses with a free end against a peripheral rim of the second hinge axis 21*b*.

Figure 6B:
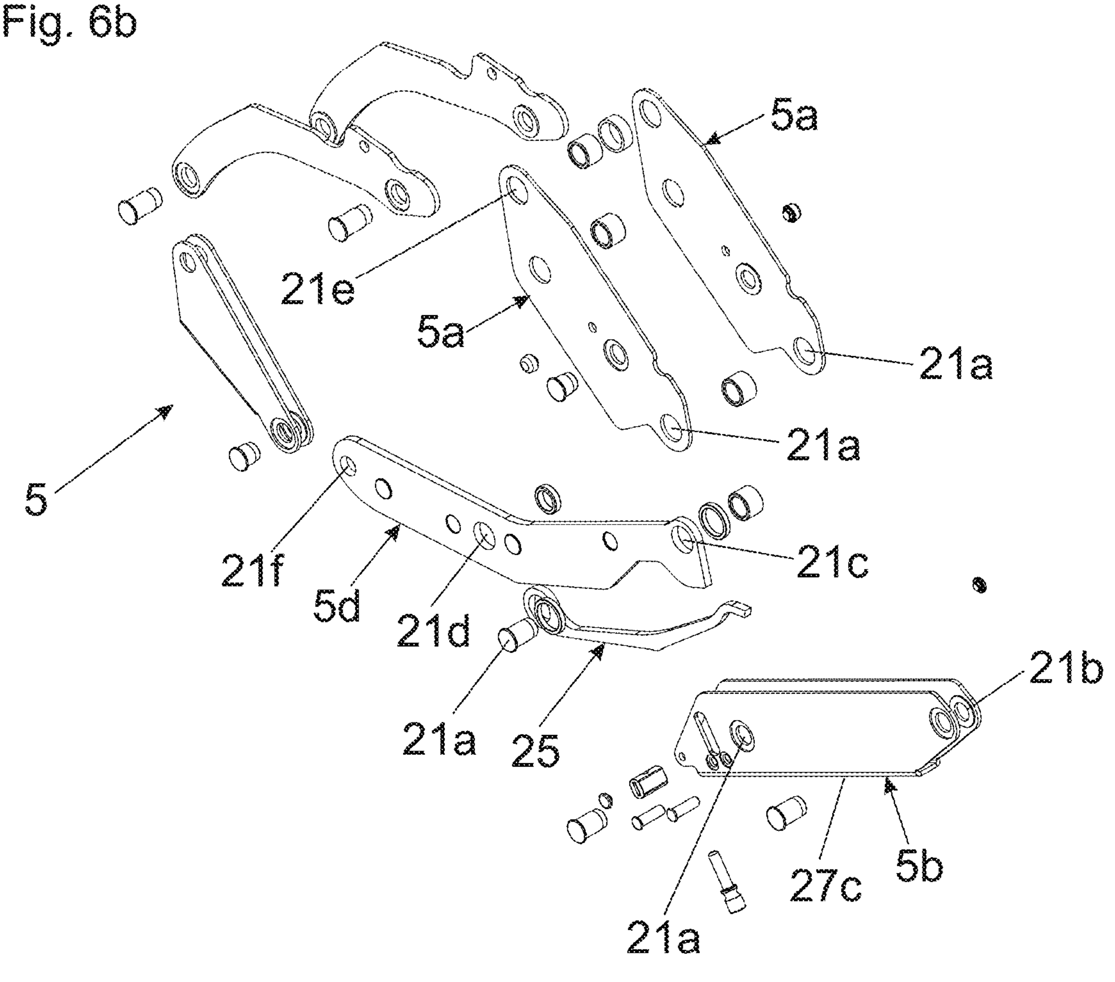

FIG. 6*b* shows an exploded view of the lever mechanism 5 shown in FIG. 6*a*. The spring element 25 pivotable about the hinge axis 21*a* can be seen, the spring element 25 being supportable on an abutment 27*c* of the lever 5*b* and being configured to press against the hinge axis 21*b*.

The invention claimed is:

1. A furniture fitting for movably supporting a furniture part on a furniture carcass, the furniture fitting comprising:

a lever mechanism for moving the furniture part, the lever mechanism including a lever pivotally supported about a hinge axis, and the lever has a cylindrical opening in which the hinge axis is arranged with a clearance between the hinge axis and a peripheral edge of the cylindrical opening, a force storage member configured to apply a force to the lever mechanism, the hinge axis being configured to, upon a pivoting movement of the lever, move from a first bearing location within the cylindrical opening to a second bearing location within the cylindrical opening under the influence of the force storage member, and a spring element configured to apply pressure to the hinge axis with a force in a direction extending transversely to a virtual straight line connecting the first and second bearing locations of the hinge axis within the cylindrical opening of the lever.

2. The furniture fitting according to claim 1, wherein the lever mechanism has a dead-center position at which the lever mechanism is neither pressurized in a closing direction nor in an opening direction by the force storage member, and the hinge axis is movable from the first bearing location to the second bearing location when the dead-center position is exceeded.

3. The furniture fitting according to claim 1, wherein the cylindrical opening of the lever includes a bearing contour connecting the first bearing location and the second bearing location to each other, wherein the cylindrical opening and the hinge axis are configured such that, upon a pivoting movement of the lever, the hinge axis is glidingly guided along the bearing contour under the influence of the force storage member and the spring element.

4. The furniture fitting according to claim 1, wherein the lever mechanism comprises a lever configuration arranged in a parallelogram-shape, and the lever configuration includes the lever.

5. The furniture fitting according to claim 1, wherein the lever is a first lever connected to a second lever of the lever mechanism via the hinge axis, wherein a relative position of the first lever and the second lever is varied upon a pivoting movement of the lever mechanism.

6. The furniture fitting according to claim 5, wherein the hinge axis is a first hinge axis, and the second lever is pivotally connected to a third lever of the lever mechanism via a second hinge axis.

7. The furniture fitting according to claim 1, wherein the spring element presses against a peripheral rim of the hinge axis.

8. The furniture fitting according to claim 1, wherein the spring element is supported on an abutment.

9. The furniture fitting according to claim 1, wherein the spring element has at least one of the following features:

is at least partially curved, is at least partially elastically deformable, is a form spring, consists of metal, and is operative between the hinge axis and a second hinge axis of the lever mechanism.

10. The furniture fitting according to claim 1, wherein the lever mechanism includes at least five hinge axes.

11. The furniture fitting according to claim 1, wherein the furniture fitting includes an adjustment device configured to adjust a force applied by the force storage member to the lever mechanism.

12. The furniture fitting according to claim 1, wherein the furniture fitting includes a housing configured to be inserted or to be integrated within a furniture panel of the furniture carcass.

13. An item of furniture comprising:

a furniture carcass, a furniture part movable relative to the furniture carcass, and the furniture fitting according to claim 1 for moving the movable furniture part.

14. The furniture fitting according to claim 1, wherein the force storage member is a spring device.

15. The furniture fitting according to claim 4, wherein the hinge axis is a first hinge axis, the lever configuration further including the first hinge axis and a second hinge axis, the spring element being operative between the first hinge axis and the second hinge axis.

16. The furniture fitting according to claim 6, wherein the spring element is configured to apply a force to the first hinge axis connecting the first lever to the second lever, and to also apply a force to the second hinge axis connecting the second lever to the third lever.

17. The furniture fitting according to claim 8, wherein the abutment is a pin or is a limb of the lever of the lever mechanism.

18. The furniture fitting according to claim 10, wherein the lever mechanism includes at least seven hinge axes.

19. The furniture fitting according to claim 11, wherein the adjustment device includes at least one of:

a rotatable operating element configured to be actuated to adjust a force applied by the spring device to the lever mechanism, a threaded portion configured to allow adjustment of an engagement location of the force storage member along the threaded portion by an actuation of the adjustment device, and an operating element configured such that, in a mounted condition of the furniture fitting, the operating element faces towards the movable furniture part and is arranged in a front region of a housing of the furniture fitting.

20. The item of furniture according to claim 13, wherein the furniture part movable relative to the furniture carcass is a furniture flap configured to be elevated relative to the furniture carcass.

* * * * *